E. D. Tippett,
Reciprocating Steam Engine,
Patented Nov. 23, 1836
Sheet 1 - 2 Sheets.
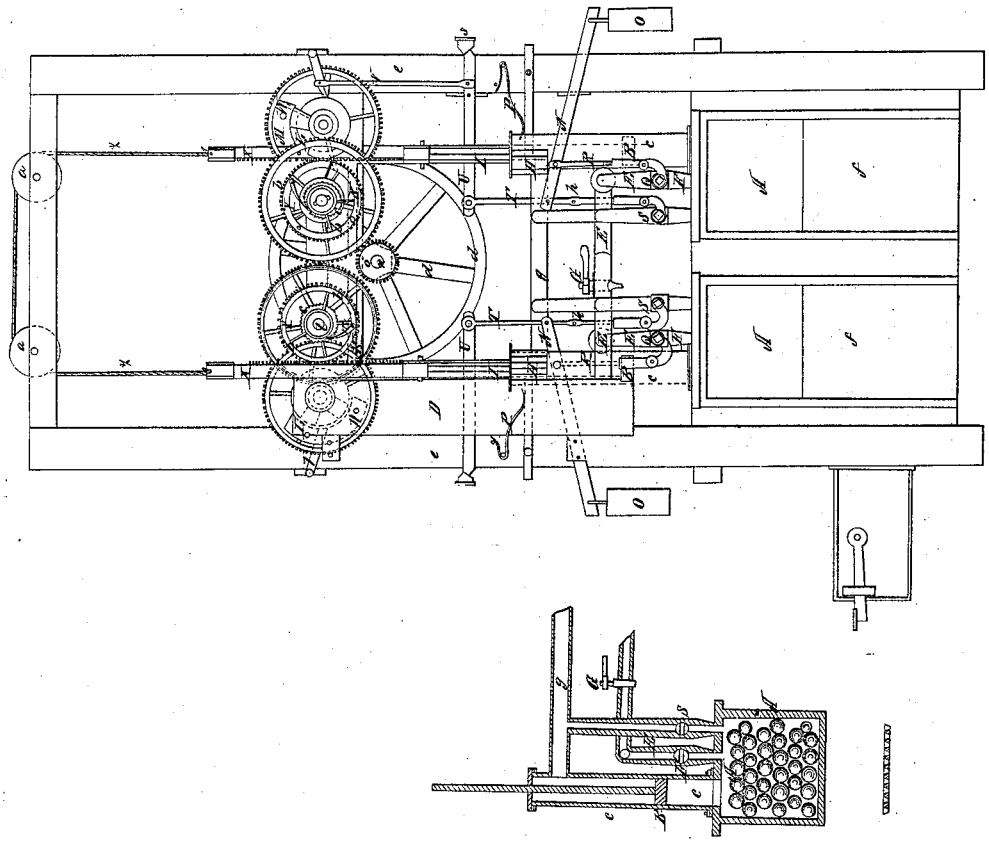
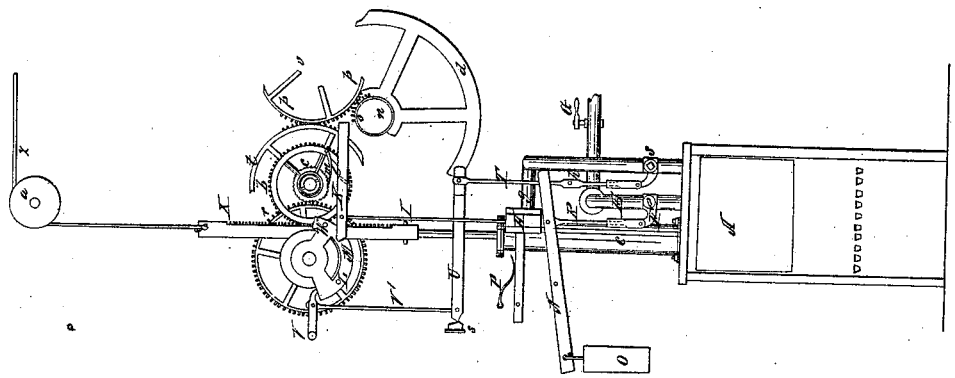

E. D. Tippett,
Reciprocating Steam Engine,
Sheet 2-2 Sheets.
Patented Nov. 23, 1836.
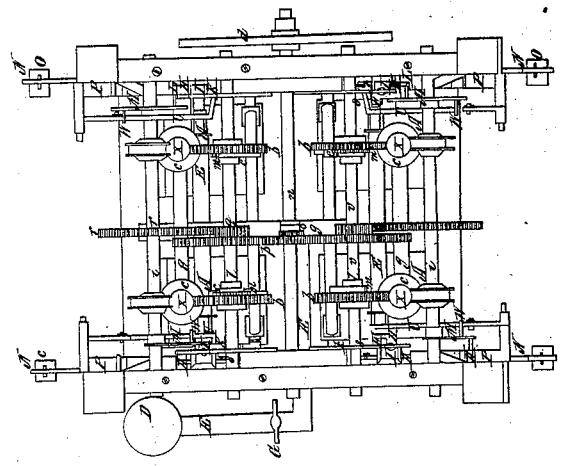
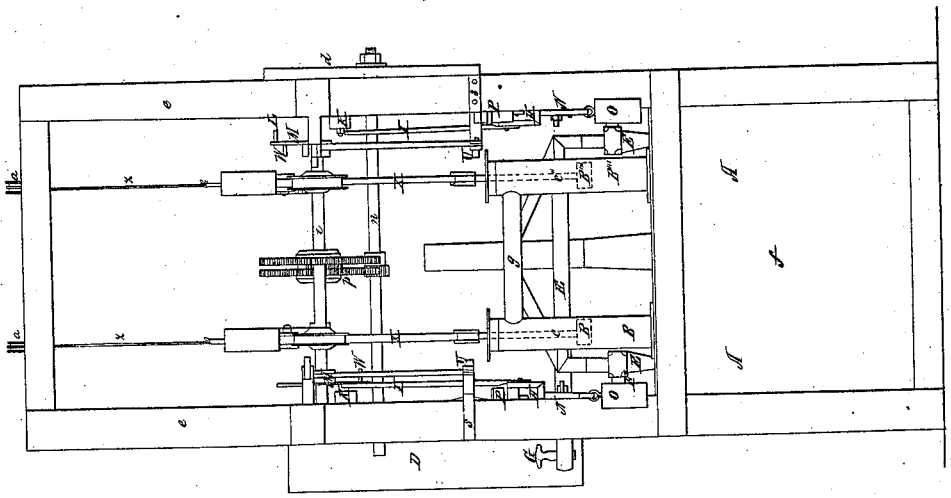

UNITED STATES PATENT OFFICE.

EDWARD D. TIPPITT, OF WASHINGTON, DISTRICT OF COLUMBIA.

SAFETY STEAM-ENGINE.

Specification of Letters Patent No. 84, dated November 23, 1836.

*To all whom it may concern:*

Be it known that I, EDWARD D. TIPPITT, of the county of Washington and District of Columbia, have invented a new, and useful Safety Steam-Engine, and that the following is a full an exact description thereof, to wit, reference being had to the annexed drawings of the same, making part of this specification.

The nature of my invention consists in generating steam by injecting small quantities of water into hot generators (A,) filled with balls or plates of iron heated to a proper heat which is converted into steam instantaneously, and acts upon the piston, B, (without a boiler) and which escapes immediately upon the ascent of the piston through an aperture into the escape tube $g$, where the steam may be condensed, or otherwise, leaving neither water or steam to cause an explosion. The generators may be made of cast, or wrought iron or copper, either cylindrical, or square, and in proper proportions, the content of which being about two cubical feet more, or less according to the power of the engine, or the quantity of water to be generated into steam. These generators are to be packed full of iron plates or balls not exactly in contact in all points, to retain heat, at the same time so packed as to admit the water between them, and to form as much surface as possible to generate the steam. It is also for another important purpose which will be here explained. If the generators are not packed with iron they must of course be filled with steam to a certain power upon the square inch according to the power of the engine required, in order to obtain that elasticity necessary to drive the machinery, hence it will be seen that a great body of steam would have to be discharged at every stroke of the piston, but by filling the generators with iron, there is no more steam produced than that which is necessary to fill the cylinder; and this is regulated by the quantity of water discharged into the generators; the steam from which upon the ascent of the piston immediately escapes through the upper escape into the escape tube ($g$) opened by the ascent of the piston.

The water is contained in a reservoir D, kept full by a common pump worked in the ordinary manner, the same is conveyed by pipes E, to each generator, and small quantities are admitted through a valve, F, into the same alternately.

Motion is given to the valves by the rotary movement of the engine, and is calculated so as to let into the generators, any given quantity of water according to the power of the engine required. The engine is put into motion by turning a common valve G, introduced in the pipe through which the water passes from the reservoir to the generators, at which place it passes through the valve, F, and is regulated by a mechanical action of equal time, and admitted into the generators according to the size of the aperture through which it passes. If it is found on any occasion that the powers of the engine should be less than the given power it is instantly effected by turning the valve G, through which the water passes to the generator, and lessening the aperture to any degree according to the power required, by which the power of the engine is calculated, and at all times regulated.

The action of each valve F, through which the water passes immediately into the generators, is performed by a tilt hammer H, worked by the rotary movement of the engine; and which is connected to a lever K, by a rod I. The lever is moved, or raised by a pin, L, set into a segment of a circle, or an arm M, upon the axis (i,) one of the wheels of the engine, and which lifts the hammer, to a given distance, and suddenly lets the hammer fall upon the end of another lever N, on the end of which is a weight O, suspended greater than the weight of the hammer, but the fall of the hammer aided by a spring P, drives this end of the lever down to a given distance which opens the valve F, by a connecting rod R, and admits the water, and at the same time strikes a pin $h$, in the rod connected to the vent valve S, and drives it down, and closes this valve, and instantly the weight O, upon the other end of the lever regains its specific gravity, and brings the tilt hammer back to its former position, closing the water valve F. Thus it will be seen that the valve F, through which the water is discharged into the generators is opened, and closed in a given time by the rod R, connected to the lever N, and to the valve, and which will discharge a given quantity of water in that given time according to the size of the aperture open, but it will be observed that the water could not pass into the generators without a vent being formed therein, nor could the piston return without said vent; another valve S, has therefore been introduced in the generators to answer both purposes so that when the water is discharged into the generators, the same stroke of the tilt-hammer closes this valve, and immediately upon the ascent of the piston it is again opened by a rod T, connected to a lever U, from said valve, and worked by another pin W, in the same segment or arm M, working the tilt-hammer H, and stands open for the escape of the surplus steam, and thus to allow of the descent of the piston, and until the water is again admitted. This valve S, serves for four valuable purposes, viz: first to form a vent in admitting the water, second, secondly, to let the piston descend or return, thirdly to let off all surplus steam after the return of the piston, and fourthly should any circumstance transpire to prevent the ascent of the piston after the water has been discharged into the generators this valve would be opened by the rotary movement of the engine, and the steam would here escape without causing an explosion.

The safety of this engine consists in the manner of generating steam in the before described generators, and the application of its expansive force acting on the piston in producing a rotary motion by the rectilineal motion of the piston rod or rack X. The piston is unlimited in its ascent not being confined to either crank, or lever, but at every discharge of water it acts with the full power of the steam generated in its ascent returns to its place, and becomes inactive, and waits a given time for another injection of water in which time the generator regains its heat.

Each generator is provided with a cylinder C, and piston B, and each piston with a rack of cogs in a straight line acting on the circumference of a cog-wheel b, so constructed that in the ascent of the piston the power of the steam is applied tangentically, or at right angles producing a rotary motion by a rectilineal motion, and thereby doing away with the dead point of the crank.

The pistons are connected by a chain L, running over pulleys a, so that in the ascent of one, the other will descend by its own specific gravity, and without any impediment to the motion of the engine. This action is so calculated that immediately upon the ascent of one, another will commence to ascend, so that at all times there will be one or more acting with full power, according to the number of generators employed in the engine, which must be in all cases governed by the continuation of the heat, and the power of the engine. This manner of generating steam may be applied in three different ways; first to generate the steam in the above manner, and convey it into common steam chambers, or reservoir, and then use it in the ordinary manner. Secondly, to generate the steam as above, and use a cylinder, and piston to each, and to each a common crank upon the same axis. Thirdly, as above described in this specification which is the only one considered perfectly safe, and free from explosions.

Operation: The generators (A) being heated, and the common valve G, turned so as to admit the water from the reservoir D, into the main conducting tube E, the water valve F, is opened by depressing lever N, and the connecting rod R, of the valve F, attached thereto, the lever N, at the same time striking the pin $h$, in the connecting rod T, of the vent-valve S, which depresses it, and closes the vent-valve, a body of steam is instantly generated which enters the cylinder c, e, placed over the generator A, and drives the piston B, up, and the rack X, on the piston rod working into the cog-wheel b, connected to the first axle $l$, by means of a pawl m, fastened on the side of the cog-wheel b, dropping into a ratchet wheel e fixed permanently on the axle $l$, turns this axle, its motion being continued, and regulated by a fly-wheel d. Another axle n, on which is a cogwheel o, into which works the cog-wheel p. On the return of the piston the first mentioned cog-wheel b, turns loosely on the shaft $l$, in a contrary direction—the pawl slipping over the teeth of the ratchet wheel—but the motion of the axle, and ratchet wheel continues in the same direction given by the first impulse by the momentum of the fly-wheel. When the piston has risen to the top of the cylinder, above the escape aperture g, the steam escapes through this aperture into the escape pipe g, where it is condensed, the vent-valve of the generator being also opened by the segment wheel M, and pin W, as will be presently described for the escape of the surplus steam in the generator, The piston will now descend by its own gravity, and the pressure of the atmosphere, and remain inactive till another jet of water is introduced, thus allowing time for the generator to regain its requisite degree of heat. On the axle $l$, is another cog-wheel q, working into a cog-wheel r, on another axle i, and on which axle, are two segment wheels M, or arms with pins L and W, for opening, and closing the valves. By the continued rotary movement of the axles as just described, a second piston, and set of valves are operated, in the following manner. The pin L, during the revolution of the segment wheel comes in contact with the lever K, to which is suspended a hammer, and raises it, and then lets it fall upon the end of another lever N, connected at one end by a rod R, to the water valve F, having at its other end a counterweight O, the weight of the hammer H, aided by a spring P, drives down one end of the lever, opens the water valve F, and admits a jet of water—at the same time closing the vent-valve S, by the lever N, coming in contact with pin $h$, on the rod of the vent-valve S, immediately the counerweight O, at the end of the lever, restores the lever to its former position, and again closes the water valve F. This weight being heavier than the hammer, the vent-valve is kept open by means of the spring catch S, which holds the end of the lever W, till another jet of water is made. The instant the water is admitted into the generator it is converted into steam—drives up the piston B, acts upon the cog-wheel $b$, by the rack X, as before described, thus continuing the rotary movement of the axles, cog-wheels, segments, and fly-wheel—the steam escapes, and is condensed as before, the pin W, in the segment M, depresses the lever U, connected by rod V, to lever W, which is connected to the vent-valve by another rod T, and opens it—the piston B, descends—the cog-wheel $b$, turning loosely on the axle $l$, while the same rotary movement of the axle is continued by the fly-wheel $d$, and by the action of the third piston B''' commencing to ascend, as the second one descends—and so on with a fourth which commences to descend as the third ascends—and in this manner the rotary movement of all the angles, cog-wheels, and segment wheels is continued, the segment wheels, and pins being so arranged on their respective axles, that one segment wheel shall commence to act in opening, and closing the corresponding set of valves, as the other ceases to act on its corresponding set, and so on alternately keeping up a constant motion in the engine. The pistons are arranged in pairs, and in this engine there are two pairs, and the two axles, $l$, and $v$, which in turn are geared together by a cog-wheel $t$, fastened on the first axle $l$, gearing into a cog-wheel $p$, on the second axle, $v$, the cog-wheel $p$, on the second axle, $v$, also working into the cog-wheel O, on the axle of the fly-wheel. The operation of all the valves, and pistons is similar, but alternate. By the above described arrangement, and mode of operating the several sets of valves, and pistons alternately, sufficient time will thus be allowed for the generators to regain the quantity of heat lost by the introduction of the water.

What I claim as my invention is—

The above mode of generating steam by introducing a jet of water into generators, nearly filled with bars or balls of iron, as above described for the purpose of generating the quantity of steam required for each action of the piston, the vent-valve above described, the arrangement of machinery, for opening, and closing the water, and vent-valves as above described, and the arrangement of machinery for causing the pistons alternately to remain at rest, thereby allowing the generators to regain the requisite degree of heat as above described.

I do not limit myself to the precise construction above described, but desire the privilege of altering the same in any manner while I attain the same end by means substantially the same.

EDWARD D. TIPPITT.

Witnesses:
 Wm. P. Elliot,
 Josh. Thompson.